(12) United States Patent
Weinmann et al.

(10) Patent No.: US 9,124,195 B2
(45) Date of Patent: Sep. 1, 2015

(54) METHOD FOR CONTROLLING A CONVERTER

(75) Inventors: Martin Weinmann, Bad Waldsee (DE); Stefan Zeh, Wangen (DE); Nicola-Valeriu Olarescu, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 381 days.

(21) Appl. No.: 13/525,527

(22) Filed: Jun. 18, 2012

(65) Prior Publication Data
US 2012/0320650 A1   Dec. 20, 2012

(30) Foreign Application Priority Data

Jun. 17, 2011 (DE) .......... 10 2011 104 742
Oct. 20, 2011 (DE) .......... 10 2011 116 615
Dec. 6, 2011 (DE) .......... 10 2011 120 333

(51) Int. Cl.
*H02M 7/5387* (2007.01)
*H02P 27/08* (2006.01)

(52) U.S. Cl.
CPC ......... *H02M 7/53875* (2013.01); *H02P 27/085* (2013.01); *H02M 2007/53876* (2013.01)

(58) Field of Classification Search
CPC ... H02M 7/483; H02M 7/53873; H02M 1/40; H02P 27/08; H02P 27/085
USPC ............ 363/16, 17, 34, 37, 39; 318/250, 254, 318/747, 752, 755, 794, 798
See application file for complete search history.

(56) References Cited

U.S. PATENT DOCUMENTS

| | | | |
|---|---|---|---|
| 4,333,948 A | 6/1982 | Weithmann | |
| 5,614,803 A * | 3/1997 | Morioka et al. | 318/801 |
| 5,736,825 A | 4/1998 | Kaura et al. | |
| 5,942,876 A * | 8/1999 | Maekawa | 318/801 |
| 6,208,216 B1 * | 3/2001 | Nasila | 332/110 |
| 6,819,078 B2 * | 11/2004 | Ho | 318/808 |
| 6,847,186 B1 * | 1/2005 | Kerlin | 318/751 |

(Continued)

FOREIGN PATENT DOCUMENTS

| | | |
|---|---|---|
| DE | 10319537 A1 | 12/2003 |
| DE | 102008046307 A1 | 4/2009 |

(Continued)

OTHER PUBLICATIONS

Stephen Williamson et al., A Comparison of PWM Switching Strategies on the Basis of Drive System Efficiency, IEEE Transactions on Industry Applications, vol. IA-20, No. 6, Nov./Dec. 1984.

(Continued)

*Primary Examiner* — Rajnikant Patel
(74) *Attorney, Agent, or Firm* — Laurence A. Greenberg; Werner H. Stemer; Ralph E. Locher

(57) ABSTRACT

A method controls a three-phase converter with a voltage intermediate circuit by pulse-width modulation for supplying a polyphase system, in particular a three-phase machine. The converter is operated with at least two different modulation methods which are selected from among the group of modulation methods which includes single-phase switching, two-phase switching and three-phase switching, and for changeovers to be made between the at least two different modulation methods depending on the operating state of the polyphase system.

14 Claims, 6 Drawing Sheets

(56) References Cited

U.S. PATENT DOCUMENTS

| | | |
|---|---|---|
| 6,995,679 B2 | 2/2006 | Eskritt et al. |
| 7,308,192 B2 * | 12/2007 | Williams et al. ............. 388/819 |
| 7,310,254 B2 * | 12/2007 | Liu et al. ...................... 363/163 |
| 7,616,466 B2 | 11/2009 | Chakrabarti et al. |
| 7,746,039 B2 * | 6/2010 | Hoffmann et al. ............. 322/89 |
| 7,888,905 B2 * | 2/2011 | Welchko et al. ............. 318/801 |
| 8,044,631 B2 * | 10/2011 | Dai et al. ...................... 318/800 |
| 8,077,491 B2 | 12/2011 | Yamasaki |
| 8,319,461 B2 * | 11/2012 | Wystup et al. ............. 318/400.2 |
| 8,456,128 B2 * | 6/2013 | Fotherby ...................... 318/800 |
| 2004/0207360 A1 | 10/2004 | Matsushiro et al. |
| 2008/0079377 A1 | 4/2008 | Williams et al. |
| 2008/0224649 A1 | 9/2008 | Bae et al. |
| 2009/0179608 A1 | 7/2009 | Welchko et al. |

FOREIGN PATENT DOCUMENTS

| | | |
|---|---|---|
| EP | 0 036 514 A2 | 9/1981 |
| EP | 0 840 441 A1 | 5/1998 |
| EP | 21484418 A1 | 1/2010 |
| EP | 2 192 682 A1 | 6/2010 |
| JP | 2004048885 A | 2/2004 |
| JP | 2005318702 A | 11/2005 |
| JP | 2008141856 A | 6/2008 |

OTHER PUBLICATIONS

Krishan K. Sharma et al., Harmonic Loss Comparison of Modulating Function Type PWM Techniques for VSI-fed Induction Motors, p. 293-299, India.

* cited by examiner

METHOD FOR CONTROLLING A CONVERTER

CROSS-REFERENCE TO RELATED APPLICATION

This application claims the priority, under 35 U.S.C. §110, of German applications DE 10 2011 104 742,9, filed Jun. 17, 2011, DE 10 2011 116 615.0, filed Oct. 20, 2011 and DE 10 2011 120 333.1, filed Dec. 6, 2011; the prior applications are herewith incorporated by reference in their entireties,

BACKGROUND OF THE INVENTION

1. Field of the Invention

The invention relates t(c) a method for controlling a three-phase converter with a voltage intermediate circuit by use of pulse-width modulation for supplying a polyphase system, in particular a three-phase alternating-current system. The polyphase system may likewise be a machine which is operated as a motor or as a generator (three-phase machine), such as a three-phase power supply system. In particular, the invention also relates to a three-phase motor of a domestic washing machine or of a drive for art automobile. The three-phase motor can be operated in the field-weakening mode or constant-power mode at full or almost full motor voltage. In particular, the converter which is provided for supplying a three-phase power supply system can be fed by a solar generator. In this respect, the invention is also suitable for operating a photovoltaic system or for operating a system having a different DC power source.

A three-phase converter for generating the output voltages for a polyphase system from a voltage intermediate circuit according to FIG. 1 has long been known from the prior art. A converter of this kind contains three half-bridges with in each ease two pairs containing a switching element and a diode which is connected in parallel. Contact is made with the individual phases for the polyphase system between the pairs of a half-bridge in each case. The voltages required for the polyphase system are given by the potential differences between the individual phases in relation to one another. The respective phase is alternately clamped to the upper or the lower intermediate circuit potential by alternately switching the two switching elements of a half-bridge.

Driving the, in total, six switching elements, of which in each case two are distributed to one of the three half-bridges of the converter, by pulse-width modulation is also known, reference being made to Handley, P. G.; Boys, J. T.; "Practical Real-Time PWM Modulators: An Assessment", IEE Proceedings B, Electric Power Applications, Volume 139, pages 96 et. seq., Issue 2, March 1992. Modern converters almost exclusively exhibit switchable power semiconductors as switching elements. In addition to field-effect transistors, MOSFETs ("Metal Oxide Semiconductor" —field-effect transistors) and bipolar transistors, in particular so-called IGBTs (Insulated Gate Bipolar Transistors), are used, as power semiconductors of this kind. In this case, the latter combine the advantages of field-effect and Bipolar transistors.

In the event of pulse-width modulation, the potential or the voltage in relation to a reference potential, for example $U_a$ in accordance with FIG. 1, is set for the phase of a half-bridge by changing the switching states of the corresponding switching elements within a predefined period duration. In other words, the duty ratio is modulated at a constant frequency in the event of pulse-width modulation. The value of the output voltage of a period duration is the result of "summation" of the switching states set in each case or results from the ratio of the switching times of the clamping to the upper intermediate circuit potential and the clamping to the lower intermediate circuit potential.

Permissible switching states of the converter are, for in each ease one half-bridge, "TopOn", that is to say upper switching element on and lower switching element off, "Bot(-tom)On", that is to say tower switching element on and upper switching element off, and "dead time" if both of the switching elements are switched off. The last switching state of a "dead time" is usually set only for negligibly small time periods (approximately 1% duration) between the states "TopOn" or "BotOn". Therefore, in the event of a negligible dead time within a period duration $T_p$ (for example 100 ms), "TopOn" for the time $T_{top}$ and then "BotOn" for the time $T_{bot}=T_p-T_{top}$ are alternately set. If the voltage of the respective half-bridges $U_a$, $U_b$ and $U_c$ according to FIG. 1 tends toward the tower branch of the voltage intermediate circuit, the voltage $U_{dc}$ being applied between the branches of the voltage intermediate circuit, the result is a pulse control factor of the respective half-bridges of $T=T_{top}/T_p$. The mean voltage for the half-bridge a is then given, by way of example, by $$U_a = \tau_a \cdot U_{dc}.$$

During stationary operation of the polyphase system, the setpoint potential differences which are to be generated or the setpoint voltages between the three phases are generally sinusoidal in three phases. In the case of a three-phase alternating current, the phase difference between the individual phases is 120° in each case. The pulse control factors of the three half-bridges of the converter are then generated by a rule of the following kind:

$$\tau_a = \hat{\tau} \cdot \cos(\omega t) + \tau_0$$
$$\tau_b = \hat{\tau} \cdot \cos\left(\omega t - \frac{2\pi}{3}\right) + \tau_0$$
$$\tau_c = \hat{\tau} \cdot \cos\left(\omega t - \frac{4\pi}{3}\right) + \tau_0$$

where $\hat{\tau}=\hat{u}_{ref}/U_{dc}$ is the amplitude of the drive level, $\hat{u}_{ref}$ is the amplitude of the setpoint fundamental, $U_{dc}$ is the voltage of the DC intermediate circuit and $\tau_0$ is the common offset of the pulse control factors.

Identifiably different variants are available for generating the desired voltages between the individual phases of the converter $U_{ab}=U_a-U_b$, $U_{bc}=U_b-U_c$, $U_{ca}=U_c-U_a$ by pulse-width modulation. Since only the voltages or difference signals between the phases $U_{ab}$, $U_{bc}$, $U_{ca}$ are required in sinusoidal form in a polyphase system, a common offset $U_0$, also called a zero system, can be superimposed on the individual potentials $U_a$, $U_b$, $U_c$. The zero system $U_0$ is selected such that the mean individual potentials at the converter branches are in the range of between zero and $U_{dc}$, that is to say $\tau_0$ is selected such that the pulse control factors $\tau_a$, $\tau_b$ and $\tau_c$ are between zero and one. In this case, a pulse control factor of $\tau_a=0$ means that the corresponding converter branch a is not switched but rather is permanently clamped to the lower intermediate circuit potential during the entire period duration. A pulse control factor of $\tau_a=1$ means that the corresponding converter branch is not switched but rather is permanently clamped to the upper intermediate circuit potential during the entire period duration.

Consequently, it can be seen that, in particular for a three-phase sinusoidal system, it is possible, in the difference signal between the phases, to generate the individual potentials of the phases by pulse-width modulation in such a way that in each case only two half-bridges are switched, while in each case the third half-bridge is permanently clamped to the upper or to the lower intermediate circuit potential and the switch-on period of this half-bridge is either one or zero. The modulation method of two-phase docking exhibits lower switching losses in comparison to the modulation method in which all three half-bridges are operated in a clocked manner in order to generate the individual potentials. The switching frequency is reduced.

A modulation method of two-phase switching is known, for example from published; European patent application EP 036 514 A1, corresponding to U.S. Pat. No. 4,333,948. In the document, only two phases or two of the half-bridges are switched in respect of each of the periods of the desired inusoidal output signal for in each case 60°, while in each case the third phase or half-bridge is permanently clamped to the upper or the lower intermediate circuit potential. As a result, the switching losses in the switching elements are reduced in comparison to the modulation method of three-phase switching. The switching frequency is reduced by a third. However, one disadvantage is that the line losses in the permanently clamped switching elements increase.

In another method of pulse-width modulation for a three-phase converter, so-called space-vector modulation, the individual possible converter switching states are assigned vectors which specifically indicate the switching state given in each case by way of a set of three numbers. The above-described switching states "TopOn" and "BotOn" of a respective half-bridge are assigned the numerical values "1" or "0" in the process. The half-bridges a, b and c correspond to the first, second and, respectively, third positions in the set of three numbers. Therefore, tor example, the set of three numbers (1,1,0) describes the switching state of the converter, with the first half-bridge a and the second half-bridge b exhibiting the switching state "TopOn" and the third half-bridge c exhibiting the switching state "BotOn". The sets of three numbers (0,0,0) and (1,1,1) are also called zero vectors since all the phases of the converter are either clamped to the upper or to the lower intermediate circuit potential in these switching states. The voltages or potential differences between the individual phases are therefore zero, and therefore these vectors have no relevance to the polyphase system. In this respect, the zero vectors are inactive states of the converter. Therefore, a total of six active possible switching configurations remain available in the case of a three-phase converter.

In respect of the space-vector modulation method, the vectors which are assigned to the active switching states are applied in accordance with FIG. 2, with adjacent vectors in each case differing only by one switching state of a half-bridge. The sectors which span the space between two adjacent vectors in each case are accordingly continuously numbered. In mathematical terms, the space-vector modulation method according to FIG. 2 is a transformation of the three-dimensional description of the output variables of a three-phase converter into the two-dimensional space. The output voltages of the converter rotate as two-dimensional vectors within the hexagon according to FIG. 2 which is spanned by the six base vectors of the states of the converter.

Voltage vectors between in each case two base vectors or active states of the converter are generated by the switch-on periods of the active states. Switching states of the zero vectors are added within the period duration, in order to generate voltage vectors which do not reach as far as the edge of the hexagon. The switch-on times of all the selected switching states add up to form the period duration of the pulse-width modulation. If no zero vectors are added, only output voltages whose associated vectors in the diagram according to FIG. 2 end at the edge of the hexagon can be generated.

Generating a voltage vector with intelligent connection of the zero vectors corresponds to the above-described modulation method of two-phase clocking. In each sector, the voltage values are set by adjacent base vectors or switching states of the converter which in each case differ only by one switching state of a half-bridge. For example, the base-vectors (1, 1, 0) and (1, 0, 0) which span the sector 1 differ only by the switching state of the second half-bridge. If a changeover is consequently made to a zero vector in each case, that is to say either to the zero vector (1, 1, 1) or to the zero vector (0, 0, 0) in the present case, within a sector, either the first or the third haft-bridge additionally remains permanently clamped to the upper or to the lower intermediate circuit potential.

FIG. 2 also shows that voltage vectors which end outside the inscribed hexagon cannot be generated. The maximum voltage magnitude prespecified by the base vectors cannot be reached within the sectors. Therefore, in accordance with FIG. 2, the vectors of the voltage limit which can be set with the converter end on a circle which inscribes the hexagon. If voltage values which lie outside the hexagon are required at the output terminals during driving of the converter, the voltage values are limited to the so-called hexagon limit, that is to say the corresponding vectors end on the edge of the hexagon. This is referred to as so-called overmodulation. The actual required voltage or potential profile of a phase can no longer be generated. The voltage between two phases of the converter then has a deformed sinusoidal profile, this being associated with undesired harmonics in the signal.

In the case of open-loop or closed-loop control of a converter for a polyphase system by space-vector-modulation, the variables which describe the system, and in particular the output variables of the converter, are generally transformed into a two-dimensional coordinate system. In the event of so-called field-oriented control, the two-dimensional coordinate system for describing the space-vector variables rotates with the magnetic flux of the polyphase system. The coordinates of the space-vector variables in the case of field-oriented control are denoted by d and q. Another possibility is transformation into a two-dimensional fixed-stator coordinate system. The coordinates of the space-vector variables in this system are denoted by $\alpha$ and $\beta$. For the purpose of controlling a polyphase system by space-vector modulation, ready measured state variables such as terminal voltages or motor currents are measured and mathematically transformed into the respective space-vector-variables, and the converter is driven to the desired switching states for generating the voltages between the phases in accordance with the transformed space-vector variables. In this case, reference is made, in particular, to the two-dimensional illustration for generating the output voltages according to FIG. 2.

In the case of current-controlled regulation of the polyphase system, the output voltages of the converter are driven in dependence on a deviation of the nominal current from a setpoint current, for example by prespecifying a setpoint value for the field-forming current component $i_d$ and a setpoint value for the torque-forming current component $i_q$. In this case, regulation of a polyphase system within the d, q coordinate system has the advantage the current component $i_d$ which leads to a reactive power, because it is field-forming, and the torque-forming component $i_q$ are immediately apparent.

Driving a converter by pulse-width modulation using space-vector variables is described, for example, in U.S. Pat. No. 6,819,078 B2. To this end, a computation algorithm is specified, with which the pulse control factors $\tau_a, \tau_b, \tau_c$ can be calculated with simple computation operations from a setpoint voltage vector in the case of vector-controlled converters. Modulation methods both with three-phase switching and also with two-phase switching are possible with the specified algorithm. In this case, overmodulation is identified by a negative switch-on period for a zero vector occurring within the algorithm, this corresponding to the requirement of a voltage value outside the hexagonal limit. In the case of overmodulation, the space-vector variable which is associated with the voltage value is rescaled, and as a result the voltage values again lie within the hexagonal limit. Therefore, overmodulation with the known disadvantages is prevented.

Furthermore, European patent EP 0 840 441 B1 discloses field-oriented control of a three-phase machine, with the output voltages being controlled at the voltage ceiling. In order to provide a voltage limit, in the event of control in the d, q coordinate system, the magnitude of the torque-forming current component $i_q$ is reduced when the voltage component $U_d$ in the flux direction reaches a limit value, and the field-forming current component $i_d$ is reduced when the voltage component $U_q$ perpendicular to the flux direction reaches a further limit value. The corresponding phase voltages of the converter are controlled in accordance with the limited voltage components $U_d$, $U_q$. In particular, the maximum available output voltage of the converter is selected for the limit values, and therefore the pulse control factors of the half-bridges, which pulse control factors are prespecified for the converter, are less than "1" and the converter is driven within the hexagonal limit. This creates a voltage reserve which is required for loading, the field-forming and/or the torque-forming current component being reduced for this purpose. Since the converter is operated below the hexagonal limit, overmodulation is avoided, this possibly leading to control problems due to voltage values which cannot be realized being required.

Published, non-prosecuted European application EP 2 192 682 A1 proposes setting the voltage requirement of a three-phase machine by a characteristic map for the field-forming current $i_d$, so that the quadrature current controller and the in-phase current controller do not reach a setting limit. If the actuating variables of the current controllers were to be limited by the maximum possible voltage, the setpoint current components $i_d$, $i_q$ would no longer be able to be controlled and the behavior of the machine would be uncertain. Overmodulation is therefore deliberately avoided here too.

SUMMARY OF THE INVENTION

The object of the invention is to specify a method for controlling a converter by pulse-width modulation of the kind cited in the introductory part, in which method the individual converter switching elements are subjected to as little loading as possible. The aim of the invention is, in particular, to be able to provide a converter with switching elements which are as cost-effective as possible.

According to the invention, the object is achieved in respect of a method of the kind cited in the introductory part in that the converter is operated with at least two different modulation methods which are selected from among the group of modulation methods which includes single-phase switching two-phase switching and three-phase switching, and in that changeovers are made between the at least too different modulation methods depending on the operating state of the polyphase system.

In this case, the invention proceeds from the consideration that it is not a method with the lowest total losses that leads to the specified objective of the use of switching elements which are as cost-effective as possible but rather that the stress for the switching elements which are subject to the greatest loading has to be minimized. In the process, the invention takes into consideration that stress for semiconductor switching elements is produced first by heating on account of line losses and second by heating on account of switching losses. In the converter, that component (switching element or diode) which is currently carrying current will be heated by line losses, and that competent (switching element or diode) which changes over from the current-blocking state to the current-conducting state, or vice versa, will be heated by switching losses.

The invention now further identifies that the modulation methods of three-phase switching, two-phase switching and single-phase switching differ from one another in respect of the switching cycles, the power line cycles and the related division between the switching elements. If a switching element is switched less, the stress on the switching element due to heating on account of switching losses is reduced at the cost of stress due to heating on account of line losses. If a half-bridge is permanently clamped to the lower or to the upper intermediate circuit potential, the respectively switched-on switching element of the half-bridge is additionally subjected to loading on one side, whereas the other switching element experiences no stress. A modulation method which clamps a half-bridge on one side in this respect for certain time periods therefore leads to a higher loading of individual switching elements because the losses in a half-bridge are asymmetrically divided. On the other hand, this circumstance no longer plays any role when, in the case of relatively high rotating-field frequencies, the one-sided connection of individual switching elements is cyclically distributed to all the switching elements of the converter once again.

In this respect, the invention identifies that the stress for each individual switching element can be minimized during operation of the converter with selected modulation methods in different operating states of the polyphase system. In this respect, the invention provides the option of operating the converter such that switching elements which are as cost-effective as possible can be used. The modulation methods are selected depending on the operating state of the polyphase system in such a way that the lowest stress is produced for an individual switching element in each case.

In order to explain the invention, the individual modulation methods will be described in greater detail below with the aid of FIGS. 3-8.

FIGS. 3-8 show time profiles of the pulse control factors $\tau_a$, $\tau_b$, $\tau_c$ of the respective half-bridges of a three-phase converter, of the respectively selected zero system $\tau_0$ and of the formed difference $\tau_a - \tau_b$. The profiles of the pulse control factors $\tau_a$, $\tau_b$, $\tau_c$ correspond to the profiles of the individual potentials of the phases which are associated with the respective half-bridges. The profile of the difference $\tau_a - \tau_b$ corresponds to the profile of the voltage between the phases of the corresponding half-bridges a and b.

It is immediately apparent that, with the exception of FIG. 8 which shows overmodulation, the difference $\tau_a - \tau_b$ exhibits a sinusoidal profile irrespective of the choice of zero system $\tau_0$. In this respect, the degree of freedom in respect of the choice of modulation methods can be identified, provided that it depends only on the difference voltage between the individual phases of the converter, as in the case of a polyphase system and in particular in the case of a three-phase machine.

FIGS. 3-5 illustrate modulation methods of three-phase switching. In FIGS. 3 and 4, the zero system $\tau_0$ has a DC component and a third harmonic to the fundamental of the difference signal. In FIG. 5, the zero system $\tau_0$ is made up of a DC component and a triangular function. The DC component is selected with a value of 0.5 in each case. In FIG. 3, the amplitude $\hat{\tau}$ of the drive level at 0.2 is selected to be lower than in FIG. 4 with a value of $\hat{\tau}$ of 0.577. The last-mentioned value represents the maximum possible distortion-free amplitude of the fundamental. This can be seen in FIG. 4 in that the pulse control factors of the individual half-bridges predominantly move in the region of "one", this corresponding to driving of the converter at the voltage ceiling.

The modulation method of three-phase switching is characterized in that all three half-bridge branches are switching during a period duration of the pulse-width modulation, that is to say the upper and the lower switching element of each half-bridge are each driven in a complementary manner and change the switching pattern during each period. The configuration of the zero system or of the zero voltage is open in this case. A DC component or a DC component with superimposed harmonics of the fundamental, which is intended to exhibit the difference signal between in each case two phases, for example, is usual.

The profile illustrated in FIG. 5 corresponds to pulse-width modulation in accordance with space-vector modulation according to FIG. 2. Accordingly, the respective voltage components are formed in sectors from the base vectors which limit the sector, with the connection of one of the zero vectors in each case. In this case, each sector according to FIG. 2 corresponds to a 60° section according to the fundamental of the difference signal illustrated in FIG. 5.

The advantages of three-phase switching are found in the uniform distribution of the line losses to all the components. Disadvantages of the modulation method of three-phase clocking are the permanent switching losses in the switching elements or components.

FIGS. 6 and 7 now show the corresponding time profiles of the pulse control factors $\tau_a$, $\tau_b$, $\tau_c$ of the zero system $\tau_0$ and the difference between the pulse control factors $\tau_a - \tau_c$ for modulation methods of two-phase switching. Since the zero system can be freely chosen within certain limits, the zero system can be configured such that the switching pattern of in each case only two of the three half-bridges changes during one period of the pulse-width modulation. The potential of the third half-bridge in each case remains permanently clamped either to the upper or to the lower intermediate circuit potential. The modulation method of two-phase switching is also known as bus-clamped pulse-width modulation. In relation to a complete period of the desired difference signal between two phases, a half-bridge always remains clamped to the upper or (preferably) the lower intermediate circuit rail for 120° or is alternately clamped to the lower rail for in each case 60° and then another half-bridge is clamped to the upper rail for 60°.

FIG. 6 shows the modulation method of two-phase switching according to the "60° bus-clamped" method and the diagrams in FIG. 7 show the modulation method of two-phase clocking according to the "120° bus-damped" method. The value of the amplitude $\hat{\tau}$ is selected to be 0.4 in FIG. 6 and the diagram on the left-hand side in FIG. 7. The amplitude is prespecified at a value of $\hat{\tau}=0.577$, that is to say the maximum possible distortion-free amplitude of the fundamental, in the diagram on the right-hand side in FIG. 7. The respective zero system $\tau_0$ is given by the corresponding computation rule for the desired two-phase clocking.

In accordance with FIG. 6, always only two phases are switched, with in each case the third phase being permanently clamped to an alternating intermediate circuit potential for 60°. Similarly, in each case only two phases are clocked in the diagrams in FIG. 7, but with in each case the third phase being permanently clamped to the same intermediate circuit potential for 120°.

The modulation method of two-phase switching has the advantage of switching losses which are reduced by one third in total in comparison to the modulation method of three-phase switching. The switching frequency of the switching elements is lower by a third. However, the permanently clamped switching elements disadvantageously conduct 100% of the current and can therefore be subject to more stress than in the modulation method of three-phase switching, primarily at slow rotating-field frequencies.

FIG. 8 now shows the modulation method of single-phase switching. In this case, the switching pattern of in each case only one of the three half-bridges changes during a period of the pulse-width modulation. Proceeding from the diagram on the right-hand side in FIG. 7, it can be seen that the illustrated modulation method according to FIG. 8 is possible by the converter being operated theoretically above the voltage ceiling, that is to say theoretical pulse control factors for the individual half-bridges of >1 being required. In other words, the modulation method of single-phase switching leads to overmodulation, and therefore the fundamental of the output signal can no longer be illustrated without distortion as the difference between in each case two phases. In this respect, FIG. 8 illustrates in thin dashed lines the actually required pulse control factors and the resulting difference signals compared to those which are really set. The sinusoidal difference signal $\tau_a - \tau_b$ is distorted compared to a desired sinusoidal profile.

The modulation method of single-phase switching has the advantage of switching losses which are reduced by two thirds in total in comparison to the modulation method of three-phase switching. The switch-on frequency of the changeover elements is reduced by two thirds. One disadvantage of a modulation method of single-phase switching is the distortion of the fundamental. In addition, single-phase switching requires the control loop to be of special design since theoretical pulse control factors which the converter is really no longer in a position to supply are prespecified for the half-bridges.

In the overmodulation range, more output voltage than can actually be output is required by the current controllers in the case of field-oriented control. In this case, the maximum possible pulse control factor of "one" is selected instead of the actually required pulse control factor of >1. Large quantities of harmonic currents are generated in the overmodulation range. The current controllers are then subjected to high loading by harmonic currents. Current controller saturation and oscillating operations lead to a drop in power.

In contrast to the previous prior art according to which overmodulation is provided but intended to be prevented by control where possible, the present invention deliberately provides the modulation method of single-phase switching as one of the options for driving the converter, depending on operation. The modulation method of single-phase switching allows some of the lost heat from the switching elements of the converter to be transmitted to the polyphase system specifically at high voltage values by corresponding current control. In particular, reactive current, which leads to losses in the degree of efficiency of the polyphase system, can be deliberately generated at high voltage values. However, the degree of efficiency does not need to be impaired but rather improved for the overall system containing the converter and polyphase system, with the stress on the individual switching element of the converter being reduced. As will be explained in further detail below, the modulation method of single-phase switching can be designed to be deliberately tolerant in respect of distortion of the fundamental and the overmodulation can be prompted by a suitable setpoint value for the field-forming current.

The illustrated modulation methods of single-phase, two-phase and three-phase switching are accordingly associated with different advantages and disadvantages. One or the other variant provides more advantages depending on the operating state of the polyphase system. The invention therefore makes provision for changeovers to be made between at least two of the described three variants during operation of the polyphase system, depending on the operating state of the polyphase system.

The converter is preferably operated with the modulation method of three-phase switching during starting and/or at low rotating-field frequencies of the polyphase system. In the modulation method of two-phase switching, no switching losses are produced in the currently permanently clamped branch, but the disadvantage is that the line losses are not distributed to the upper and the lower switching element of a half-bridge but are produced solely in the connected switching element/diode pair of a half-bridge. The residence time in a 60° section of a modulation method of two-phase switching can be very long specifically when starting a polyphase system, in particular three-phase machine, from the stationary state.

Whereas the line losses which are produced are uniformly distributed to the upper and the lower switching element/diode pair of a half-bridge to some extent in the case of three-phase switching, the line heat losses are concentrated on a single switching element/diode pair in the case of two-phase switching. Therefore, it is necessary to design each individual switching element/diode pair such that continuous and permanent line heat loss doss not destroy the components. This leads, on account of the fundamentally given operating state during starting, to the components used having to be designed to be larger than would otherwise be required if the "starting" operating state where to be operated with three-phase switching.

Therefore, provision is preferably made to operate the converter with the modulation method of three-phase switching during starting and/or at low rotating-field frequencies.

Provision is advantageously made to change over to the modulation method of two-phase switching only when the converter is operated above a minimum rotating-field frequency of the polyphase system. The provision of a minimum rotating-field frequency allows the residence times of the individual switching elements in a 60° or in a 120° section to be so short that the local heating allows continuous connection during this residence time.

If the two variants are combined, the power loss produced in the switching elements can be uniformly shifted to all the switches.

Therefore, in the limiting case, smaller and therefore more cost-effective switching elements or smaller heat sinks can be used than when, according to the prior art, the converter would have been operated either in accordance with the modulation method of three-phase switching or in accordance with the modulation method of two-phase switching.

The minimum rotating-field frequency is preferably selected to be between 8 Hz and 12 Hz. It has been found here that operation of the converter in accordance with the modulation method of two-phase switching below this frequency leads to undesired and permanent heating of the switching elements. If a changeover is made to the modulation method of three-phase switching below this frequency, the lost heat can again be discharged by conduction in the switched-off state of a switching element. In the case of two-phase switching however, the higher residence time of the switching elements in the connected state leads to a certain summation of the lost heat by conduction. In particular, the minimum rotating-field frequency is fixed at a value of 1 Hz.

In the case of a three-phase machine for driving the drum of a washing machine, the three-phase switching is preferably applied during the start phase or during a low rotation speed for separating laundry. In the case of an operating state with a washing rotation speed, that is to say at rotation speeds of greater than 40 revolutions per minute (rpm), a changeover is further preferably made to two-phase clocking.

In a further preferred refinement, the converter is operated with the modulation method of single-phase switching when the polyphase system is operated with output voltage above a minimum voltage value. Single-phase clocking is selected when, for example, the maximum fundamental voltage is intended to be output, in order to further reduce the switching losses and in order to make the full voltage from the voltage intermediate circuit available for the polyphase system.

The minimum voltage value is preferably selected to be between 60% and 70% of the possible voltage adjustment range of the converter. Above this minimum voltage value, it has been found that a changeover from two-phase switching to single-phase switching exhibits advantages in respect of the maximum stress loading on a switching element of the converter. The changeover is implemented by suitable open-loop and closed-loop control methods. In this case, single-phase switching is expediently favored since measures are taken so that, above the specified minimum voltage value, the voltages which are output by the converter move at the voltage ceiling of the converter. This can be performed, for example, by raising a current setpoint value, in the case of field-oriented control particularly by raising the setpoint value for the field-forming current $i_d$. Since raising the current values leads to a rise in the terminal voltage (see European patent EP 0 840 441 B1 for example), the value of the output voltages which are to be output can be brought close to the value of the intermediate circuit voltage in this way. According to FIG. 2, this means that the voltage vectors in the space-vector modulation are raised to the edge of the hexagon above the minimum voltage value. In the process, the reduction in the stress limit value of an individual switching element of the converter is achieved at the cost of a reduction in the degree of efficiency of the polyphase system, but this does not have to have an adverse effect on the total degree of efficiency of the system overall and, in addition, provides the option of employing more favorable components or using smaller heat sinks in the converter.

In a further advantageous design variant, the invention makes provision, for the modulation method of single-phase switching in the event of field control, for a field-forming current to be set in such a way that overmodulation occurs in respect of the output voltages. In this case, the required voltage amplitude Of the converter is varied by the reactive, current. As a result, in the event of field-oriented control, the output voltage increases with the field-forming current $i_d$ at a given rotation speed of the machine, and drops with a negative $i_d$. In order to be able, for example with a limited output voltage, to operate a permanent-magnet synchronous, machine at rotation speeds which are so high that the no-load voltage is greater than the available output or terminal voltage, a negative $i_d$ current is applied to the machine, that is to say a so-called field-weakening current. The magnitude of the field-weakening current is prespecified in this case by tables or by controllers for voltage amplitudes. Overmodulation is suppressed by suitable control algorithms in the case of this method which is known from the prior art.

In the present case, a field-forming current is now deliberately prespecified in such a way that the required voltage vectors or voltage amplitudes move significantly at the voltage ceiling or in the region of the hexagonal limit in the case of operating states above the minimum voltage values, that is to say in particular in the case of field-weakening rotation speeds.

In this respect, the invention makes provision, in one development, for field amplification to be expressly operated, for which purpose a positive field-forming current is applied or an induction machine is operated above the nominal flux, in particular in a permanent-magnet synchronous machine for carrying out the single-phase clocking.

In the case of a three-phase machine for driving the drum of a washing machine, a changeover is made to the modulation method of single-phase switching in the event of the "spinning" operating state, that is to say when spinning rotation speeds are reached, that is to say rotation speeds of greater than 300 drum revolutions per minute.

In addition to the described measures of raising the required output voltages towards the hexagonal limit, the invention also expediently makes provision, for the modulation method to become single-phase switching. The switch-on time of a switching element shall be raised to 100% in case the required theoretical switch-on time of the said switching element is above an upper threshold value and/or the switch-on time of a switching element shall be lowered to 0% in case the required theoretical switch-on time of the said switching element is below a lower threshold value. This measure can be formed, in particular, by a non-linear snap function which is integrated in a control device for pulse-width modulation, also called pulse-width modulator for short.

By the non-linear snap function or the modified modulation method of single-phase switching, the switch-on periods or pulse control factors which are in the vicinity of the voltage limit and are theoretically still possible are already raised or lowered to the voltage limit provided that they are close to this voltage limit in respect of the specified limits. In this case, advantageously switch-on times of between 93% and 97% for the upper threshold value and of between 2% and 6% for the lower threshold value have proven advantageous. In particular, the upper threshold value is fixed at 95% and the lower threshold value is fixed at 3%. The corresponding result of a modulation method of single-phase switching is illustrated in FIG. 8. In the figure, the snap function shows that the actually theoretical profile of the pulse control factors $\tau_a$, $\tau_v$, $\tau_c$ is already raised or lowered to the limit value of 1 or 0 before said values are reached. The snap function implemented here is characterized in that a modulation method of two-phase clocking turns into overmodulation in accordance with the "120° bus-clamped" method and the signal is "snapped" and is raised or lowered to the corresponding maximum value before the values 1 and 0 are reached. In this case, an amplitude of $\hat{\tau}_{theoretical}=0.6$ is theoretically achieved. The originally desired sinusoidal profile of the difference signal is distorted. The theoretically required profile is shown, the result in accordance with single phase switching with the snap function being shown in relation to the above by a bold line.

The modulation method of single-phase switching illustrated in FIG. 8 has the further advantage that there is no change in the switching pattern of any of the half-bridges in any regions. This occurs in the regions in which the snap function is active. Switching losses are also further minimized as a result.

Furthermore, the invention specifies a converter containing three half-bridges with in each case two switching elements which are connected in series, with a pulse-width modulator being provided which is designed to drive the converter in accordance with the abovementioned method.

Other features which are considered as characteristic for the invention are set forth in the appended claims.

Although the invention is Illustrated and described herein as embodied in a method for controlling a converter, it is nevertheless not Intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

FIGS. 1-2 and 3-8 have already been explained in detail in connection with the description of the invention. Accordingly, reference is made to the relevant passages of the description.

Figure 1:
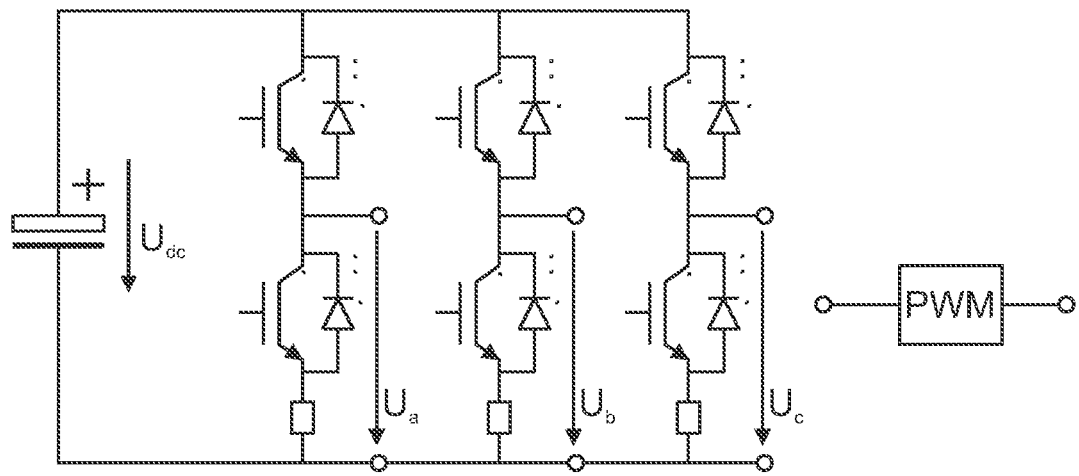
FIG. 1 is a circuit diagram of a known three-phase converter according to the prior art.
Figure 2:
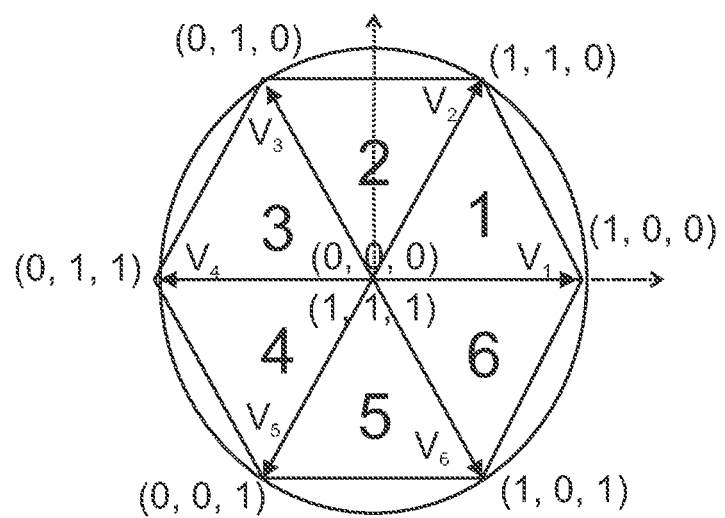
FIG. 2 is a hexagon illustration of a space-vector modulation of a three-phase converter.
Figure 3:
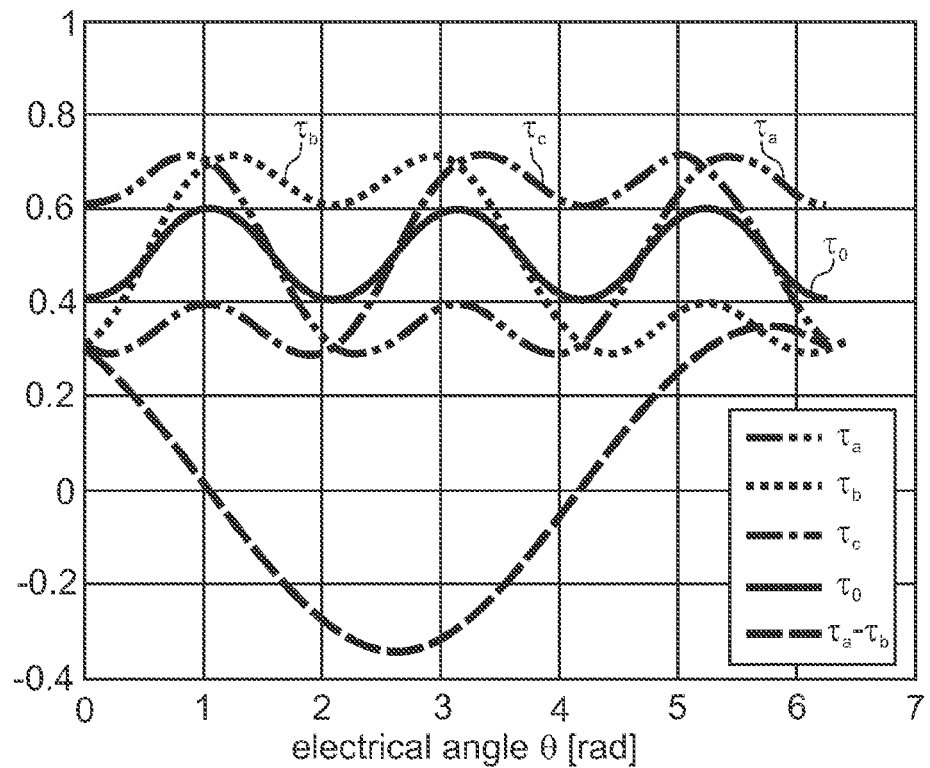
FIGS. 3-8 are graphs each showing time profiles of pulse control factors of half-bridges, a selected zero system, and a phase difference signal for various modulation methods.
Figure 4:
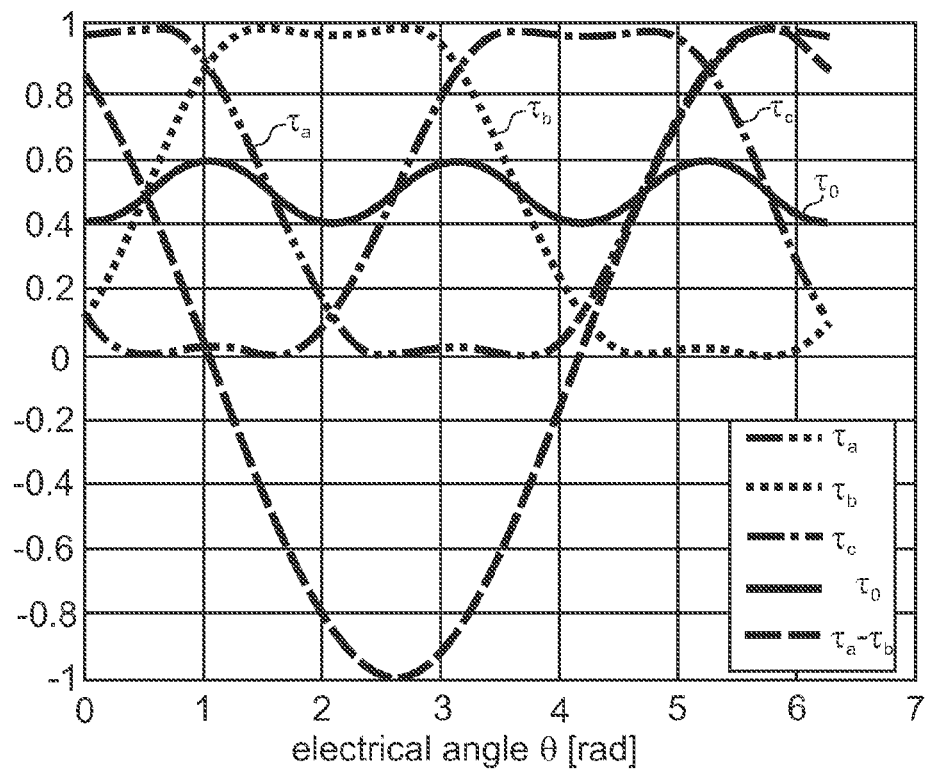
Figure 5:
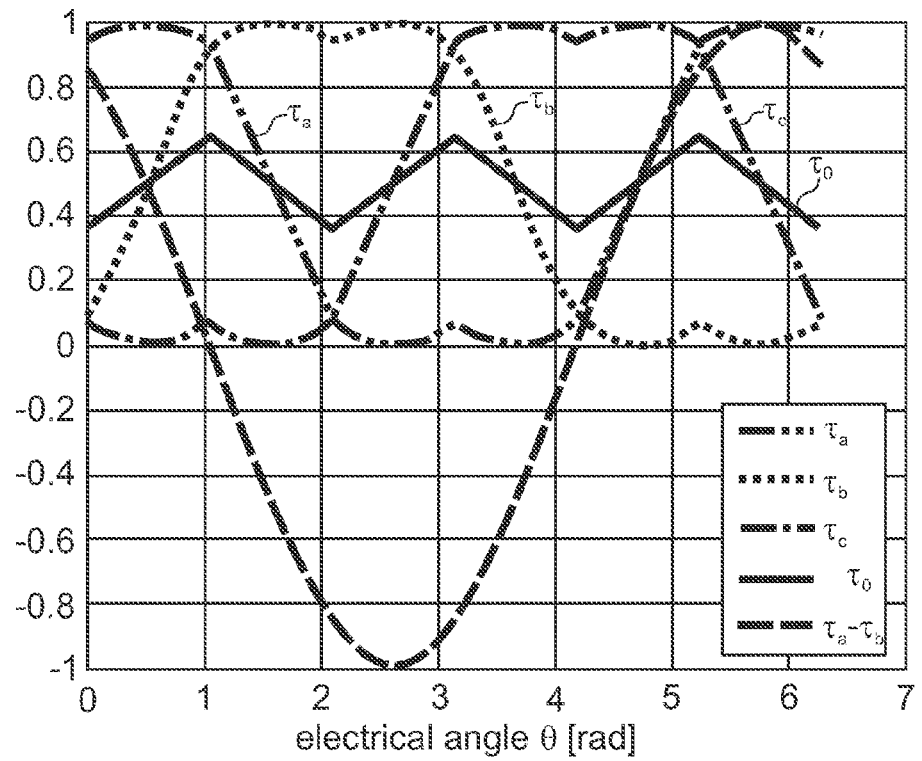
Figure 6:
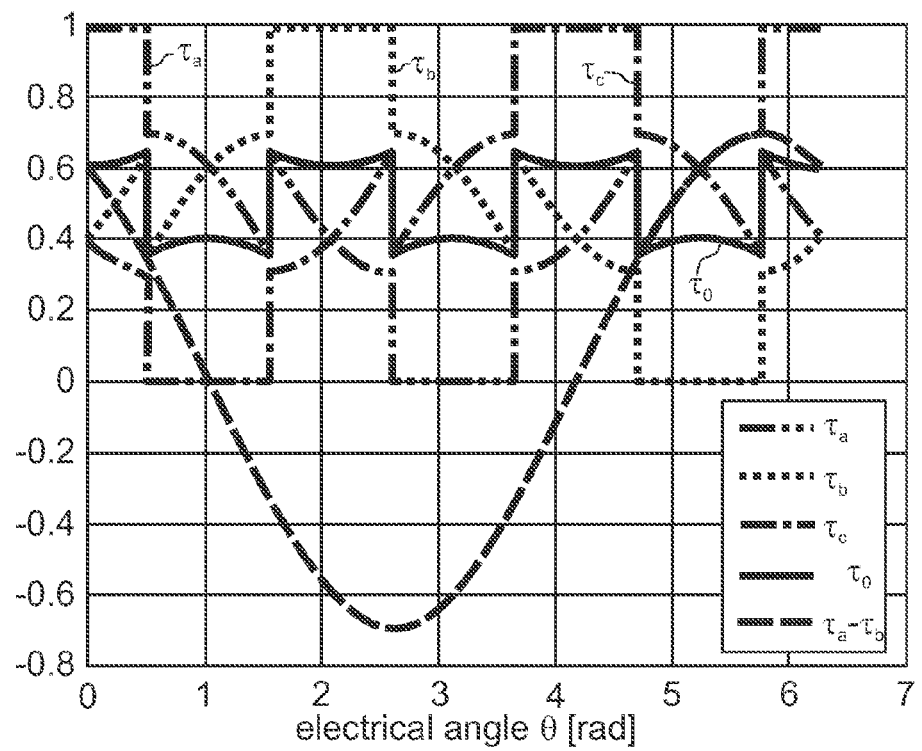
Figure 7:
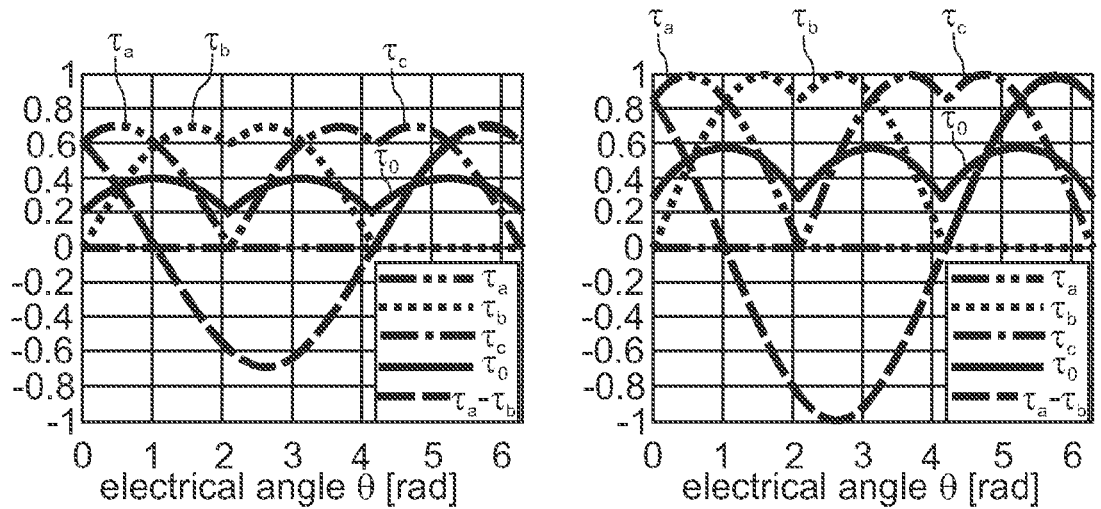
Figure 8:
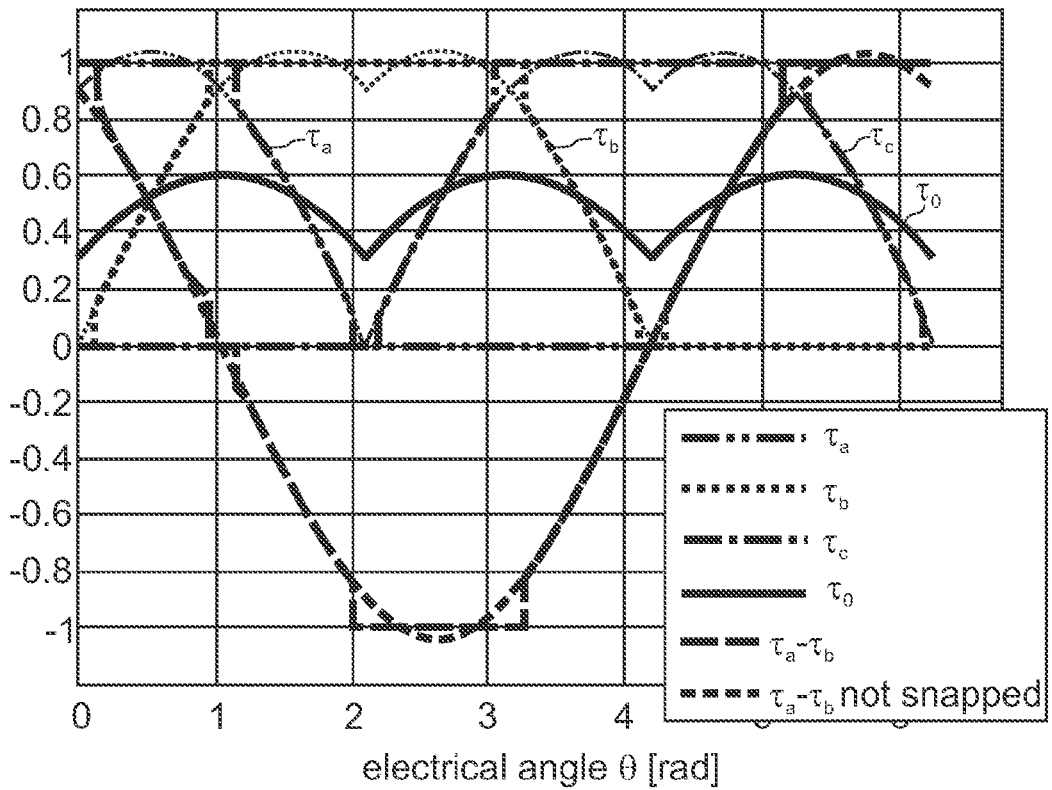
Figure 9:
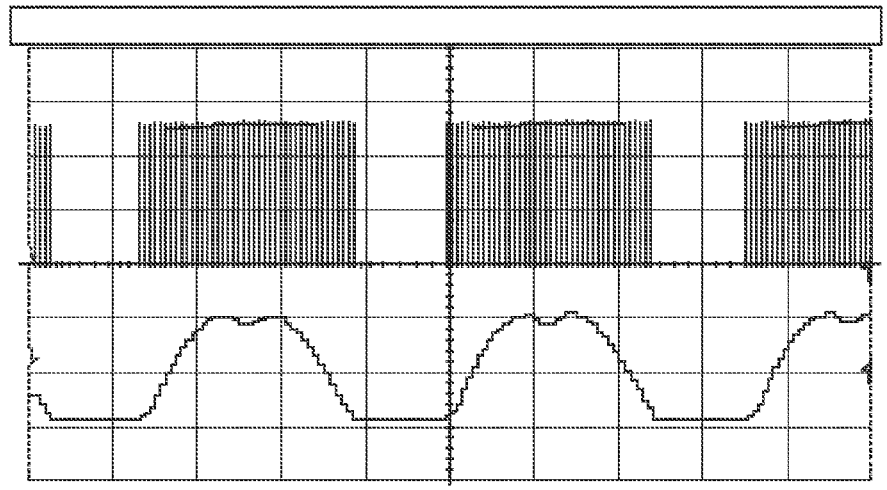
FIG. 9 is a graph showing a measured profile of an output voltage of one phase of a converter which is operated with two-phase switching.

FIG. 9 shows a profile, which is measured by an oscilloscope, of an output voltage of the phase of a three-phase converter (lower profile) with the corresponding switching cycles of the associated half-bridge (upper profile). In this case, the converter is operated with a modulation method of two-phase switching according to the "120° bus-clamped" method. The associated half-bridge is accordingly permanently clamped to the lower intermediate circuit potential for 120° in each case. The switching elements of the half-bridge are not clocked in this region, as clearly shown in the upper profile. The voltage amplitude is selected in such a way that it moves at the maximum in the vicinity of the voltage limit. In this respect, overmodulation occurs sporadically, this being shown in the upper profile in that clocking "is discontinued" in sections in the region of the maxima of the lower profile.

Figure 10:
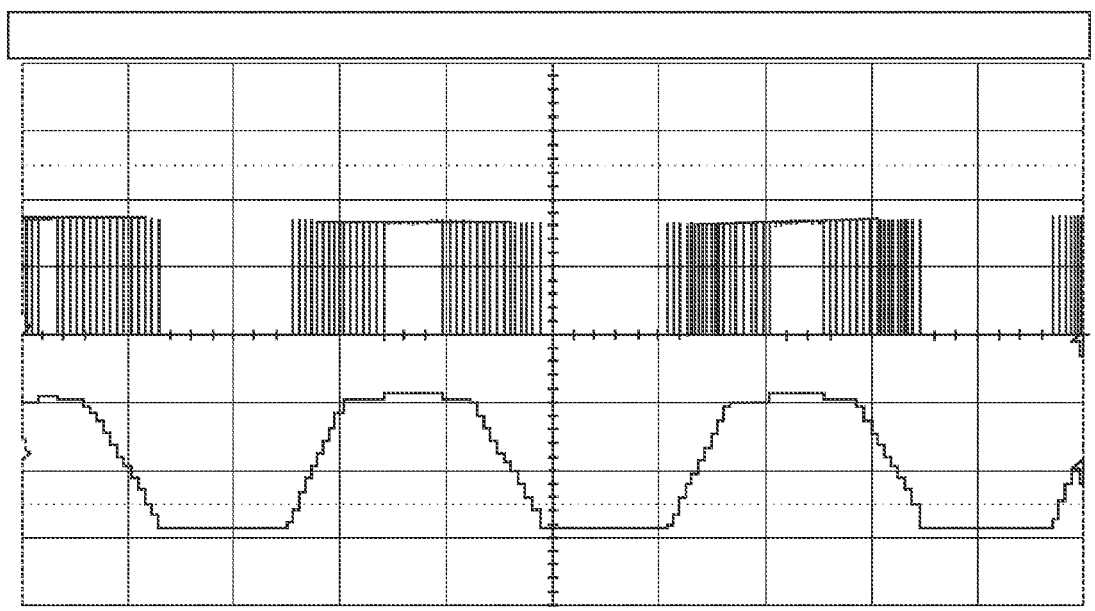
FIG. 10 is a graph showing the measured profile of an output voltage of one phase of a converter which is operated with single-phase switching with a snap function.

FIG. 10 shows the corresponding profile to FIG. 9 but with measures for promoting single-phase switching now being performed. In this case, for example, the setpoint value for the field-forming current component $i_d$ is raised, so that the voltage amplitude in the illustrated phase is increased. It can be seen that overmodulation now permanently occurs at the maxima of the illustrated voltage profiles. In this respect, switch-on times above 100% or pulse control factors above a value of 1, which can no longer be realized, are continuously required for control. There is no longer any switching of the half-bridge at the maxima of the lower profile. Instead, the half-bridge is permanently clamped to the upper intermediate circuit potential here. The single-phase clocking according to FIG. 10 is further extended by implementing a snap function, so that not even one of the half-bridges continues to be switching in regions.

Figure 11:
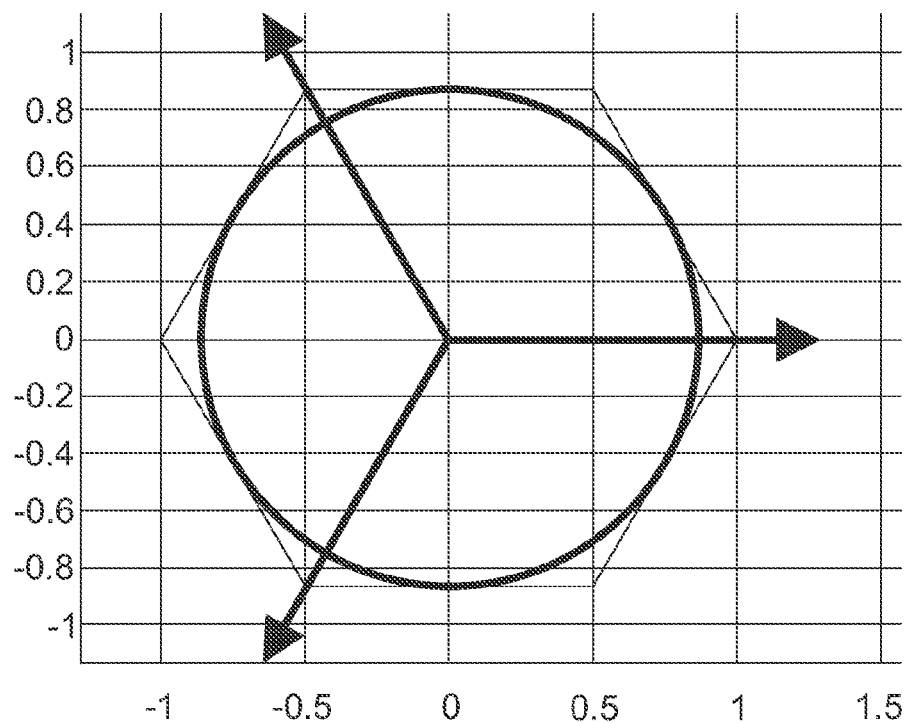
FIG. 11 is an lustration showing the hexagon of the space-vector modulation with the voltage limit shown.
Figure 12:
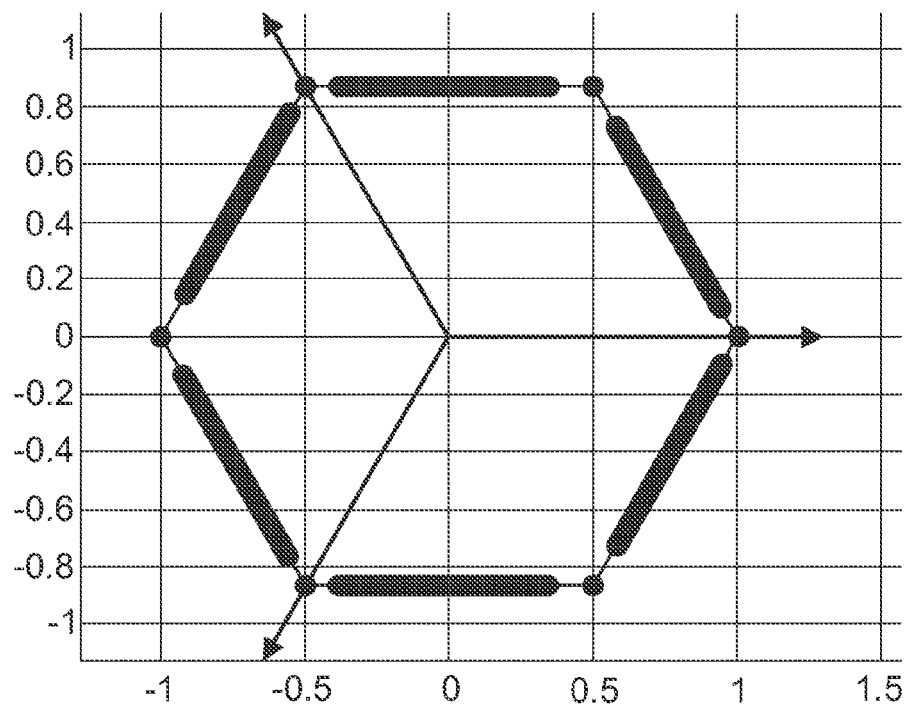
FIG. 12 is an illustration of single-phase switching with a snap function in the hexagon of the space-vector modulation.

FIGS. 11 and 12 each show the hexagon of a pulse-width modulation by space-vector modulation. FIG. 11 shows the hexagon with an inscribed circle. This circle represents the maximum possible voltage amplitude which leads to a distortion-free fundamental. The circle does not leave the edge of the hexagon.

FIG. 12 shows a modulation method by single-phase switching, with a snap function additionally being implemented. In this model of the space-vector modulation, single-phase switching can be shown in that the voltage vectors in each sector of the hexagon end directly at the edge of the hexagon in each case. In this respect, the connection of the zero vectors is dispensed with within each sector. The corresponding voltage vector is generated solely with the adjacent base vectors, this meaning clocking of in each case only one half-bridge. The implemented snap function can be shown in the vicinity of the corners of the hexagon in that the generated voltage vectors are swung onto the respective base vector before they actually reach the base vector. In this respect, the voltage vector is illustrated solely by a base vector in the vicinity of the corners of the hexagon. This means that none of the half-bridges is clocked in the regions of the corners.

The operation of a three-phase converter with a modulation method of single-phase switching with an implemented snap function, as described above, also constitutes an independent inventive concept which is not limited by the above-described features of the other modulation methods and it is not necessary to change over to other modulation methods in order to carry out said modulation method either.

The invention claimed is:

1. A method for controlling a three-phase converter having a voltage intermediate circuit by means of pulse-width modulation for supplying a three-phase system, which comprises the steps of:
operating the three-phase converter with at least two different modulation methods selected from the group of modulation methods consisting of single-phase clocking, two-phase clocking and three-phase clocking;
making changeovers between the at least two different modulation methods depending on a rotating-field frequency of the three-phase system;
operating the three-phase converter with a modulation method of the three-phase clocking during starting or at low rotating-field frequencies of the three-phase system; and
operating the three-phase converter with the modulation method of the two-phase clocking above a minimum rotating-field frequency of the three-phase system.

2. The method according to claim 1, which further comprises selecting the minimum rotating-field frequency to be between 8 Hz and 12 Hz.

3. The method according to claim 1, which further comprises operating the three-phase converter with a modulation method of single-phase clocking when the three-phase system is operated with output voltages above a minimum voltage value.

4. The method according to claim 3, which further comprises selecting the minimum voltage value to be between 60% and 70% of a possible voltage adjustment range.

5. The method according to claim 1, wherein for a modulation method of the single-phase clocking, in an event of control by means of space-vector modulation, adjusting an output voltage to a hexagonal limit in sectors.

6. The method according to claim 1, wherein for a modulation method of the single-phase clocking, in an event of field control, setting a field-forming current so that over-modulation occurs in respect of output voltages.

7. The method according to claim 6, which further comprises expressly operating field amplification by one of a positive field-forming current being applied or an induction machine being operated above a nominal flux.

8. The method according to claim 1, wherein for a modulation method of the single-phase clocking, performing at least one of:
raising a switch-on time of a converter switching element to 100% given a required theoretical switch-on time of the converter switching element above an upper threshold value; or
lowering the switch-on time of the converter switching element to 0% given the required theoretical switch-on time of the converter switching element below a lower threshold value.

9. The method according to claim 8, which further comprises selecting the upper threshold value of the switch-on time to be between 93% and 97% and the lower threshold value of the switch-on time to be between 2% and 6%.

10. The method according to claim 8, which further comprises rounding up or rounding down the required switch-on times of the converter switching elements by means of a non-linear snap function.

11. The method according to claim 1, which further comprises performing a modulation method of the single-phase clocking as a modulation method of 120° two-phase clocking with over-modulation.

12. The method according to claim 1, wherein the three-phase system is a three-phase machine.

13. The method according to claim 6, which further comprises expressly operating field amplification by one of a positive field-forming current being applied or a permanent-magnet synchronous machine being operated above a nominal flux.

14. A converter, comprising:
three half-bridges with in each case having two switching elements being connected in series; and
a pulse-width modulator for driving said three half-bridges, said pulse-width modulator controlling the converter by means of pulse-width modulation for supplying a three-phase system, said pulse-width modulator programmed to:
operate the converter with at least two different modulation methods selected from the group of modulation methods consisting of single-phase clocking, two-phase clocking and three-phase clocking;
making changeovers between the at least two different modulation methods depending on a rotating field frequency of the three-phase system;
operate the converter with a modulation method of the three-phase clocking during starting or at low rotating-field frequencies of the three-phase system; and operate the converter with the modulation method of the two-phase clocking above a minimum rotating-field frequency of the three-phase system.

\* \* \* \* \*